Nov. 19, 1957 T. R. HARRISON 2,813,419
APPARATUS FOR MEASURING THE DEGREE OF
SUPERSATURATION OF BOILING SOLUTIONS
Filed Nov. 12, 1954
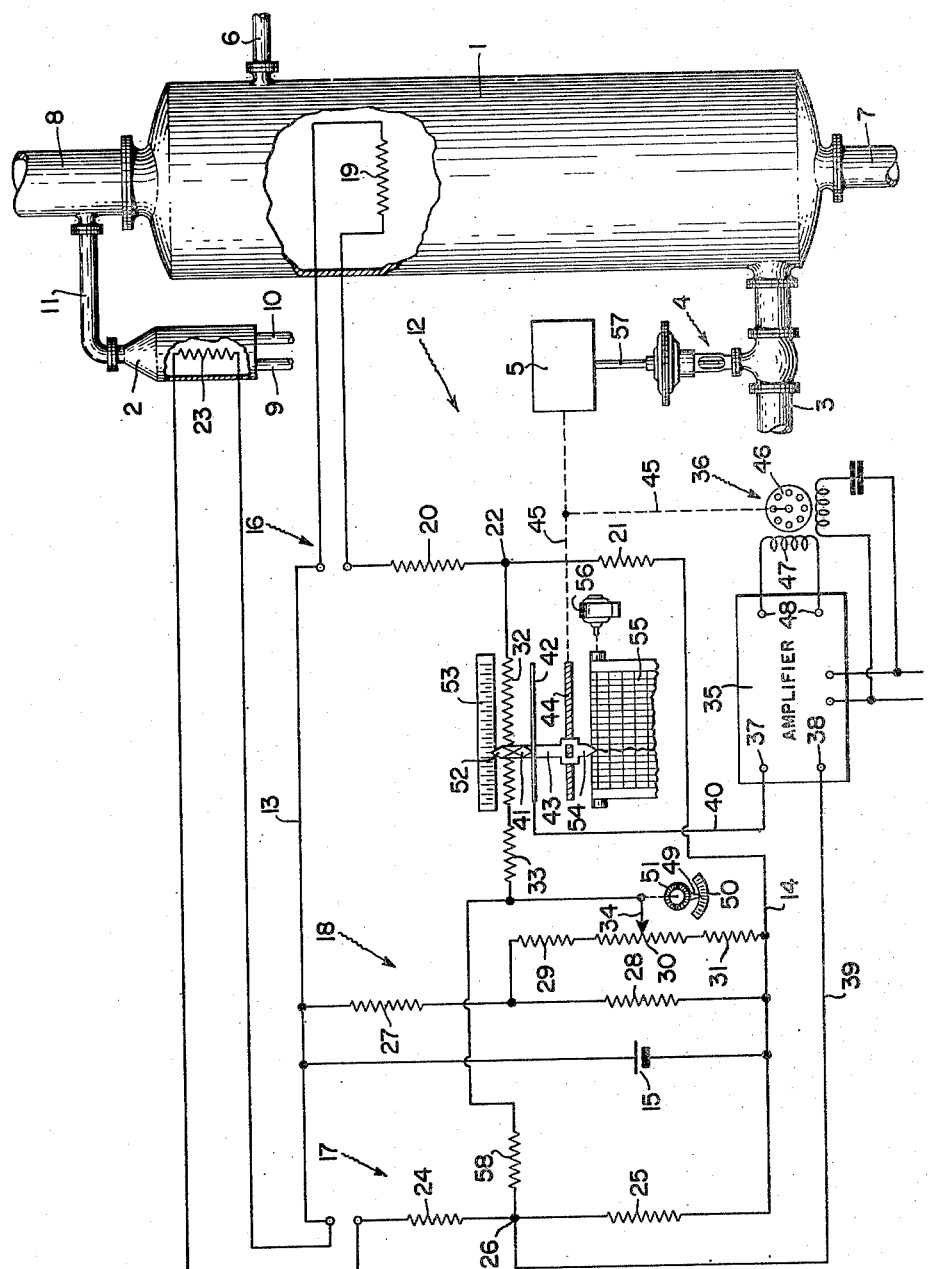
INVENTOR.
THOMAS R. HARRISON
BY Arthur N. Swanson
ATTORNEY.

_United States Patent Office_

2,813,419
Patented Nov. 19, 1957

2,813,419

APPARATUS FOR MEASURING THE DEGREE OF SUPERSATURATION OF BOILING SOLUTIONS

Thomas R. Harrison, Wyncote, Pa., assignor to Minneapolis-Honeywell Regulator Company, Minneapolis, Minn., a corporation of Delaware Application November 12, 1954, Serial No. 468,263

8 Claims. (Cl. 73—53)

The present invention relates broadly to apparatus for measuring the degree of supersaturation of solutions, and relates specifically to novel electrical apparatus for measuring the degree of supersaturation of boiling sugar solutions. More specifically, the invention relates to improved apparatus of the type specified which includes novel means for permitting the apparatus to be adjusted in accordance with the purity of the solution whose supersaturation is to be measured.

A general object of the present invention is to provide novel electrical apparatus arranged to measure the degree of supersaturation of solutions, such as boiling sugar solutions. More specifically, it is an object of the invention to provide improved supersaturation measuring apparatus, of the type including an electrical circuit and cooperating resistance thermometer elements which are respectively responsive to the temperature of a boiling solution and to the temperature of the solution solvent boiling at the same pressure as the solution, wherein there are included means to permit the apparatus to be readily adjusted in accordance with the purity of the solution.

A more specific object of the invention is to provide apparatus of the type specified including a novel circuit arrangement which is characterized by the inclusion of novel means for facilitating the proper adjustment of the apparatus in accordance with the purity of the solution whose supersaturation is to be measured. An even more specific object of the invention is to provide a novel circuit arrangement for use in sugar supersaturation measuring apparatus as specified above wherein a single, adjustable resistance element constitutes the only means required for permitting the apparatus to be properly adjusted in accordance with the purity of the associated sugar solution.

As is well known in the sugar refining art, the degree of supersaturation of a boiling sugar solution is an important index and a valuable tool in the proper performance of the sugar refining process. Accordingly, reliable apparatus for measuring this supersaturation is necessary if proper operation of the sugar refining equipment is to be had. It is also well known, however, that the supersaturation measurements obtained with apparatus of the type described above are dependent upon the purity of the associated solution as well as the actual supersaturation thereof, this purity being defined as the percentage of the desired substance, such as sugar, in the total solute of the solution. Accordingly, if such apparatus is to provide accurate measurements of the supersaturation of solutions of different purities, such apparatus must include means by which it can be adjusted in accordance with the solution purity.

The only arrangements for providing such purity adjustments in supersaturation or concentration measuring apparatus with which I am familiar are those disclosed in the several Alfred L. Holven Patents Nos. 2,135,511, 2,135,512, 2,135,513, and 2,263,847. However, each of these previously known purity adjustment arrangements is subject to the disadvantage of either being unduly complex or failing to provide satisfactory purity compensation.

Accordingly, it is a prime object of the present invention to provide novel supersaturation measuring apparatus for solutions, such as boiling sugar solutions, which includes novel and effective means of relatively simple form for permitting the apparatus to be properly adjusted in accordance with the particular degree of purity of the solution under measurement at any given time, thereby to permit the apparatus to make accurate and reliable measurements of the supersaturation of solutions having different purities.

In accordance with the present invention, the novel supersaturation measuring apparatus thereof comprises three series circuits connected in parallel between a pair of terminals adapted to be connected across a source of energizing voltage. Alternatively, each of these three circuits may be connected across and energized from a separate source of energizing voltage having a common connection to the others of such separate sources. The first of these circuits includes a first resistance thermometer element adapted to be exposed to the temperature of a boiling solution, such as a sugar solution, whose supersaturation is to be measured by the apparatus. The second of the three series circuits includes a second resistance thermometer element adapted to be exposed to the solvent of said solution boiling at substantially the same pressure as said solution.

The apparatus of the present invention also includes a resistor connected between a point in said first of the three series circuits and an adjustable point on resistance means included in the third of said three series circuits. Finally, a current detector is connected between a point adjustable on said resistor and a point in said second of the three series circuits.

The adjustability of the point on said resistance means included in said third circuit provides a novel means by which the apparatus can be readily adjusted or compensated for the purity of the solution under measurement. Thus, when the point on said resistance means has been adjusted to a position therealong corresponding to the then-existing value of the solution purity, the adjusted position of the point along said resistor for substantially zero current through said detector is an accurate measure and indication of the degree of supersaturation of the solution, irrespective of the actual purity value. By adjusting the point on said resistance means to the proper position for the purity of the solution each time that this purity changes in value, the same degree of solution supersaturation will always cause the adjusted position of the point on said resistor for zero detector current to occur at substantially the same position along the resistor, irrespective of the actual value of the solution purity, throughout the purity and supersaturation ranges of the apparatus.

If the apparatus did not include the above described means for adjusting it in accordance with the solution purity, or if the point on the resistance means were not adjusted in accordance with the actual purity of the solution, the same degree of actual solution supersaturation would cause the zero current position of adjustment of the point on said resistor to occur at a different place for each different solution purity. Therefore, the novel means of the invention for permitting the apparatus to be adjusted in accordance with the actual value of the solution purity permits the use of a single calibrated supersaturation scale in cooperation with the point on said resistor, and yet permits accurate measurements to be made of solution supersaturation and changes therein for different purities of the solution and for solutions of different purities.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

The drawing shown herein by way of illustration and example is a diagrammatic representation of apparatus for measuring and regulating the degree of supersaturation of a boiling sugar solution.

The apparatus illustrated by way of example in the single figure of the drawing comprises a form of my novel supersaturation measuring and controlling apparatus associated with a sugar boiling system. This system includes a vacuum pan 1 and a pilot pan 2. Each of these pans is shown as being of conventional form. Thus, the vacuum pan 1 is provided with a sugar solution inlet connection 3 through which sugar solution passes into the lower portion of the pan 1 at a rate dependent upon the adjustment of a valve 4 which is subjected to opening and closing adjustments by a controller 5. The pan 1 is also provided with a steam inlet connection 6, a sugar outlet connection 7, and a vacuum connection 8.

The pilot pan 2 is provided with steam and water connections 9 and 10, respectively, and with a vacuum connection 11. The latter communicates with the vacuum connection 8 of the vacuum pan, whereby the sugar solution boiling in the vacuum pan 1 and water boiling in the pilot pan 2 are caused to boil under the same subatmospheric pressure, in the known manner. The connections 9 and 10 to the pilot pan 2 maintain the proper level of boiling water in the pan 2.

The novel supersaturation measuring apparatus associated with the pans 1 and 2 comprises a circuit 12 including a pair of energizing terminal conductors 13 and 14 connected across a source of energizing voltage, shown as a battery 15. In lieu of the battery 15, the apparatus may be energized from any other suitable D. C. or A. C. source.

Connected in parallel between the energizing conductors 13 and 14 are a first series circuit 16, a second series circuit 17, and a third series circuit 18. The circuit 16 comprises a first resistance thermometer element 19 connected in series with first resistance means comprising resistors 20 and 21. A first point 22 in this circuit between the resistors 20 and 21 divides the circuit into first and second parts between the conductors 13 and 14. The element 19 is located within the vacuum pan 1, and has its resistance determined by the temperature of the sugar solution within the pan 1.

The circuit 17 comprises a second resistance thermometer element 23 connected in series with second resistance means comprising resistors 24 and 25. A second point 26 in this circuit between the resistors 24 and 25 divides the circuit into first and second parts between the conductors 13 and 14. The element 23 is located within the pilot pan 2, and has its resistance determined by the temperature of the boiling water in the pan 2. The said second parts of the circuits 16 and 17 are those adjacent the conductor 14.

The circuit 18 comprises third resistance means connected between the conductors 13 and 14 and comprising resistors 27, 28, 29, 30, and 31. The resistors 27 and 28 are connected in series between the conductors 13 and 14, and the resistors 29, 30, and 31 are connected in series across the resistor 28.

A resistor 32 is connected in series with a resistor 33 beween the point 22 and a third point 34 which consists of a contact engaging and adjustable along the resistor 30. The adjustable contact 34 permits the apparatus to be adjusted in accordance with the purity of the solution in the pan 1 as will be discussed more fully hereinafter.

The apparatus also includes a current detecting and apparatus rebalancing means consisting of an amplifier 35 and a reversible electric rebalancing motor 36. Input terminals 37 and 38 of the amplifier 35 are connected by conductors 39 and 40 between the point 26 and a fourth point 41 consisting of a contact engaging and adjustable along the resistor 32. A collector bar 42 connects the conductor 40 to the contact 41 throughout the range of adjustment of the latter along the resistor 32.

As will be further discussed below, the amplifier 35 is operative to control the rotation of the motor 36 in accordance with the magnitude and direction of any current flow which occurs within the input circuit of the amplifier 35, and hence in accordance with the magnitude and polarity of any potential difference between the point 26 and the contact 41.

In the apparatus which has just been described, the adjusted position of the contact 41 along the resistor 32 which balances the apparatus, by causing substantially no current to flow in the input circuit of the amplifier 35, is a function of the degree of supersaturation and the purity of the solution in the vacuum pan 1. For the purpose of making this balancing adjustment of the contact 41 take place automatically, the latter is mounted on a member 43 which is caused to be adjusted along the resistor 32 by the rotation of the motor 36. Specifically, the member 43 is carried by a threaded shaft 44 which is coupled by a mechanical linkage 45 to the rotor 46 of the motor 36. The latter also has a control winding 47 which is connected to output terminals 48 of the amplifier 35. Accordingly, whenever the apparatus becomes unbalanced, the resulting potential difference between the point 26 and contact 41, and the resulting current flow in the input of the amplifier 35, cause the motor 36 to adjust the member 43 and contact 41 along the resistor 32 in the direction and to the extent necessary to reduce said potential difference and current flow substantially to zero, and hence to rebalance the apparatus.

Since the null detecting and apparatus rebalancing amplifier 35 and motor 36 just described are of a well-known type which is shown, for example, in the Wills Patent No. 2,423,540, no further description of these portions of the apparatus is deemed to be necessary herein.

Since the position of the contact 41 for balance of the apparatus is influenced both by the supersaturation and the purity of the solution in the pan 1, as previously noted, it is apparent that means must be included in the apparatus to compensate the latter for different values of solution purity if the position of the contact 41 is to be dependent solely upon solution supersaturation, as is desired. It is for this purpose of permitting the apparatus to be readily and simply adjusted in accordance with the solution purity that the contact or point 34 on the resistor 30 in the circuit 18 is made manually adjustable.

More specifically, it is noted that apparatus of the type being described, but without the feature of the adjustable contact 34, can be constructed and calibrated so that the position of the contact 41 will provide a measure and indication of the solution supersaturation for some single value of solution purity. If the purity of the solution changes, however, the same actual supersaturation values will not cause the contact 41 to be positioned at the same points which it took for the original value of purity. In fact, any given actual supersaturation value will cause the contact 41 to be positioned at a different point for each different value of solution purity. Therefore, such apparatus is useful only at some particular value of solution purity, and is not of any appreciable value in practice, since solutions of different and frequently changing purities are constantly encountered in the sugar boiling and refining art.

In the operation of the apparatus of the present invention, however, the contact 34 is manually adjusted along the resistor 30 to a point corresponding to the then existing value of the solution purity. Such adjustment is facilitated by a pointer 49 and purity scale 50 associated with an adjusting knob 51 for the contact 34. The value of the purity of the solution to which the contact is to be set can be readily determined from a sample of the solution by analysis in any of the known ways.

By keeping the contact 34 manually adjusted in accordance with the actual purity of the solution in the pan 1, as determined by tests made at necessary intervals, the rebalancing contact 41 is caused to be positioned in accordance with solely the solution supersaturation. Thus, for different values of solution purity, the same actual value of solution supersaturation always causes the balanced position of the contact 41 to be substantially the same, irrespective of the actual value of the purity. Therefore, for each adjusted purity value, the contact 41 is positioned throughout the supersaturation range in substantially the same manner as for the other adjusted purity values. All of the foregoing applies, of course, only throughout the supersaturation and purity ranges for which the particular instrument is designed and constructed.

Since the adjusted position of the contact 41 for apparatus balance is, therefore, an accurate measure of solution supersaturation for various solution purities, a pointer 52 is arranged on the member 43 to be positioned along with the contact 41. Cooperating with the pointer 52 is a scale 53, which may be calibrated directly in supersaturation units. As will be apparent from the foregoing, the pointer 52 will always register with substantially the same supersaturation point on the scale 53 for the same value of actual solution supersaturation, provided that the contact 34 is properly adjusted in accordance with the actual solution purity.

In addition to providing an accurate indication of the solution supersaturation, the apparatus is also arranged to provide a record of this quantity. To this end, the member 43 also carries a marking element or pen 54 which cooperates with a record sheet or chart 55 in the usual manner. A chart drive motor 56 advances the chart 55 with respect to time in the customary way.

As was previously noted, the apparatus includes a controller 5 and control valve 4, the latter being located in the sugar solution inlet connection 3 to the pan 1. The controller 5 is shown as being actuated through the linkage 45 in accordance with the measured value of solution supersaturation, and the valve 4 is shown as being actuated by the controller 5 through a connection 57. Thus, the controller 5 can be set to hold the supersaturation of the solution in the pan 1 at some desired value, whereafter the controller 5 will adjust the valve 4, and hence the rate of flow of raw sugar solution into the pan 1, as necessary to hold the solution supersaturation, as measured by the position of the member 43, at the desired value.

In addition to the elements of the apparatus previously described, the latter includes a resistor 58 connected between the point 26 and the contact 34. This resistor provides a desirable function by causing the circuit 12 to be symmetrical with respect to the elements 19 and 23.

The adjustability of the point or contact 34 performs two essential and mutually related functions in the apparatus in connection with the compensation of the latter for the purity of the solution. Specifically, the adjustment of the contact 34 changes the ratio between the voltages across the portions of the circuit 18 which are above and below the contact 34, and at the same time varies the effective resistance from the contact 34 to the conductors 13 and 14 provided by the resistance means of the circuit 18. Moreover, the adjustment of the contact 34 changes these two quantities simultaneously in the relative manner necessary to provide the desired purity compensation.

I have found that the provision of the adjustable contact 34, providing as it does the actions just enumerated, permits the apparatus to be compensated for different solution purities in a simple and effective manner, requiring as it does the movement of but a single resistor contact. I have also found that such purity compensation permits a single supersaturation scale to be employed for all of the values of solution purity lying within the range of the apparatus, and causes a given, actual supersaturation value to place the scale pointer at substantially the same point on the scale irrespective of the particular value of the purity at that time, again, of course, within the operating range. I have also found that the supersaturation measurements made with such apparatus are sufficiently accurate for the purpose of conducting sugar boiling operations in the required manner, notwithstanding the relative simplicity of the means for adjusting the apparatus for different solution purities.

By way of illustration and example, and not by way of limitation, the following table lists the values for the components of two different typical instruments designed according to the present invention. These instruments had ranges of 0–400% saturation, and 50–100% purity.

| Element | | Design A | Design B |
|---|---|---|---|
| Res. Ther. 19 | ohms | 658–713 | 658–713 |
| Resistor 20 | do | 10 | 10 |
| Resistor 21 | do | 119.6 | 120 |
| Res. Ther. 23 | do | 658–713 | 658–713 |
| Resistor 24 | do | 10 | 10 |
| Resistor 25 | do | 119.6 | 120 |
| Resistor 27 | do | 25.06 | 201.8 |
| Resistor 28 | do | 6.049 | 50.49 |
| Resistor 29 | do | 20 | 80 |
| Resistor 30 | do | 50 | 100 |
| Resistor 31 | do | 1,500 | 2,800 |
| Resistor 32 | do | 20 | 20 |
| Resistor 33 | do | 37.87 | 10 |
| Resistor 58 | do | 57.87 | 30 |
| Battery 15 | volts | 1.5 | 1.5 |

Although the term "supersaturation" has been employed throughout the foregoing description to define the quantity which is measured by the apparatus described, it is to be understood that the apparatus is equally as well adapted for the measurement of solution saturations below the supersaturation level: that is, below 100% saturation. In fact, it is noted that the particular embodiment of the apparatus whose component values are listed herein by way of example is stated as having a measuring range of 0–400% saturation, which means that this apparatus was arranged to measure undersaturation (saturations below 100% saturation) as well as supersaturation (saturations above 100% saturation). If desired, the scale of the apparatus can be limited entirely to the undersaturation range or to the supersaturation range, depending upon the purpose for which the particular apparatus is to be used.

It is obviously possible, of course, to energize the three series circuits 16, 17, and 18 from separate sources of energizing voltage instead of from the single source 15. If this is done, one or the other of the conductors 13 and 14 can be dispensed with in the usual manner. The operation of the apparatus would obviously remain the same as described hereinbefore.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. Apparatus for measuring the degree of saturation of a boiling solution, comprising a first resistance thermometer element and a first resistance means connected in a first series circuit between a first pair of terminals, said first element being adapted to be exposed to the temperature of the boiling solution, a second resistance thermometer element and a second resistance means connected in a second series circuit between a second pair of terminals, said second element being adapted to be exposed to the temperature of the solvent of said solution boiling at substantially the same pressure as said solution, a first point in said first circuit dividing the latter into first and second parts between said first terminals, the first of said parts including said first element, and the second of said parts including at least a portion of said first resistance means, a second point in said second circuit dividing the latter into first and second parts between said second terminals, the first of the last mentioned parts including said second element, and the second of the last mentioned parts including at least a portion of said second resistance means, a third resistance means connected in a third circuit between a third pair of terminals, a resistor connected between said first point and a third point adjustable on said third resistance means, a current detector connected between an adjustable fourth point on said resistor and said second point, means operable to adjust said third point on said third resistance means for adjusting the apparatus in accordance with the purity of said solution, energizing means adapted to be connected between each of said pairs of terminals to energize said first, second, and third circuits, a common connection connecting together one of each of said pairs of terminals, the polarities of said terminals being so related that there is produced between said second and fourth points a potential difference of a magnitude and sense respectively representative of the extent and direction of unbalance of the apparatus, means operable to adjust said fourth point on said resistor and hence to adjust the potential of said fourth point relative to that of said second point as required to make said potentials substantially equal and of the same sense and thereby reduce to zero said potential difference and the current flow through said detector, the adjusted position of said fourth point on said resistor for substantially zero current flow through said detector being a measure of the degree of saturation of said solution, and fourth resistance means connected between said second and third points.

2. Apparatus as specified in claim 1, wherein said third resistance means comprises a first resistor connected between said third terminals and a second resistor connected in parallel with at least a portion of said first resistor, and wherein said third point is adjustable on said second resistor.

3. Apparatus as specified in claim 1, wherein said third resistance means comprises first and second resistors connected in series between said third terminals and a third resistor connected in parallel with at least a portion of said second resistor, and wherein said third point is adjustable on said third resistor.

4. Apparatus for measuring the degree of saturation of a boiling solution, comprising a pair of terminals adapted to be connected across a source of energizing voltage, a first resistance thermometer element and a first resistance means connected in a first series circuit between said terminals, said first element being adapted to be exposed to the temperature of the boiling solution, a second resistance thermometer element and a second resistance means connected in a second series circuit between said terminals, said second element being adapted to be exposed to the temperature of the solvent of said solution boiling at substantially the same pressure as said solution, a first point in said first circuit dividing the latter into first and second parts between said terminals, the first of said parts including said first element, and the second of said parts including at least a portion of said first resistance means, a second point in said second circuit dividing the latter into first and second parts between said terminals, the first of the last mentioned parts including said second element, and the second of the last mentioned parts including at least a portion of said second resistance means, said second parts of said first and second circuits being adjacent the same one of said terminals, a third resistance means connected between said terminals, a resistor connected between said first point and a third point adjustable on said third resistance means, a current detector connected between an adjustable fourth point on said resistor and said second point, the connections to said terminals being so related that there is produced between said second and fourth points a potential difference of a magnitude and sense respectively representative of the extent and direction of unbalance of the apparatus, means operable to adjust said third point on said third resistance means for adjusting the apparatus in accordance with the purity of said solution, means operable to adjust said fourth point on said resistor and hence to adjust the potential of said fourth point relative to that of said second point as required to make said potentials substantially equal and of the same sense and thereby reduce to zero said potential difference and the current flow through said detector, the adjusted position of said fourth point on said resistor for substantially zero current flow through said detector being a measure of the degree of saturation of said solution, and fourth resistance means connected between said second and third points.

5. Apparatus as specified in claim 4, wherein said third resistance means comprises a first resistor connected between said terminals and a second resistor connected in parallel with at least a portion of said first resistor, and wherein said third point is adjustable on said second resistor.

6. Apparatus as specified in claim 4, wherein said third resistance means comprises first and second resistors connected in series between said terminals and a third resistor connected in parallel with at least a portion of said second resistor, and wherein said third point is adjustable on said third resistor.

7. Apparatus for measuring the degree of saturation of a boiling solution, comprising first and second terminals adapted to be connected across a source of energizing voltage, a first resistance thermometer element connected between said first terminal and a first point, said first element being adapted to be exposed to the temperature of the boiling solution, a first resistor connected between said first point and said second terminal, a second resistance thermometer element connected between said first terminal and a second point, said second element being adapted to be exposed to the temperature of the solvent of said solution boiling at substantially the same pressure as said solution, a second resistor connected between said second point and said second terminal, a third resistor connected between said first terminal and a third point, a fourth resistor connected between said third point and said second terminal, a fifth resistor connected between said third point and said second terminal in parallel with said fourth resistor, a sixth resistor connected between said first point and a fourth point adjustable on said fifth resistor, means operable to adjust said fourth point on its resistor for adjusting the apparatus in accordance with the purity of said solution, a seventh resistor connected between said second and fourth points, a current detector connected between said second point and a fifth point adjustable on said sixth resistor, and other adjusting means operable to adjust said fifth point on said sixth resistor, the adjusted position of said fifth point on said sixth resistor for substantially zero current flow through said detector being a measure of the degree of saturation of said solution.

8. Apparatus as specified in claim 7, wherein said fifth point is a sliding contact engaging and adjustable along said sixth resistor, and wherein said detector includes means mechanically coupled to said other adjusting means and operative upon the occurrence of current flow through said detector to adjust said sliding contact to a position along said sixth resistor at which said current flow is reduced substantially to zero.

References Cited in the file of this patent

UNITED STATES PATENTS

| | | |
|---|---|---|
| 1,758,494 | Behr | May 13, 1930 |
| 2,135,511 | Holven | Nov. 8, 1930 |